Jan. 26, 1960   A. HOHMANN ET AL   2,922,995
CREEP CAM INDEXING MECHANISM
Filed Oct. 29, 1954   3 Sheets-Sheet 1

INVENTORS.
ALBERT HOHMANN
LINCOLN M. KEEFE
BY
J. B. Felshin
ATTORNEY.

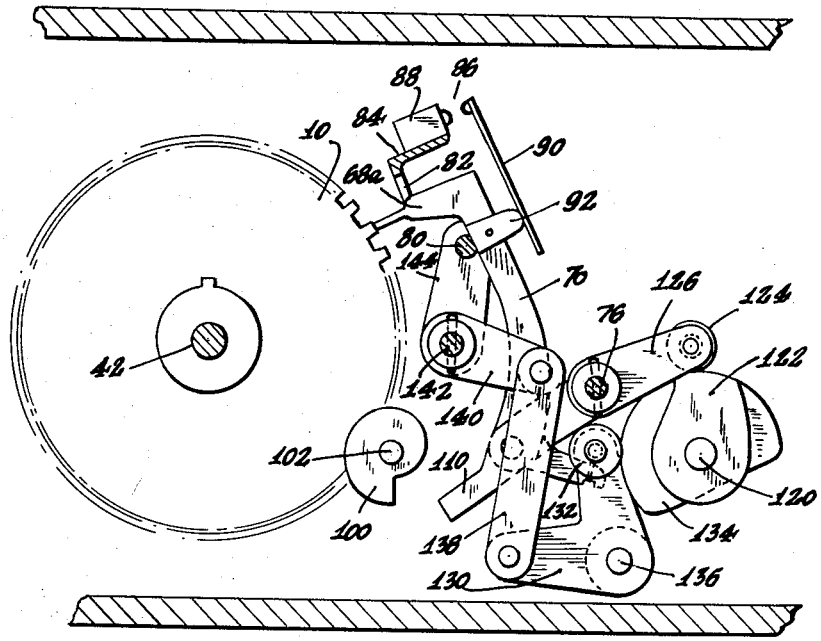

Jan. 26, 1960

A. HOHMANN ET AL 2,922,995

CREEP CAM INDEXING MECHANISM

Filed Oct. 29, 1954

INVENTORS.
ALBERT HOHMANN
LINCOLN M. KEEFE

BY

ATTORNEY.

United States Patent Office 2,922,995
Patented Jan. 26, 1960

2,922,995

CREEP CAM INDEXING MECHANISM

Albert Hohmann, Teaneck, N.J., and Lincoln M. Keefe, Elmhurst, N.Y., assignors to Benjamin Cooper, Brooklyn, N.Y.

Application October 29, 1954, Serial No. 465,527

13 Claims. (Cl. 340—347)

This invention relates generally to digital converters having plural differentially rotatable stepped cams and, in particular, to a novel indexing mechanism for accurately indexing the sensing means associated with the stepped cams.

Conventionally, digital converters comprise one or more rotary cams having the periphery therefor formed to provide a plurality of differing steps. A sensing device for each stepped cam is provided that is movable into engagement with the arrested stepped cam and switching means are controlled thereby. The electrical switching means may be connected to extraneous equipment for printing, recording, etc. It is understood that the function of the digital converter is to convert increments of angular rotation into digital information. The increments of angular rotation may be determined by an extraneous control means such as an electronic potentiometer or similar measuring device that indicates measurements with a rotary indicator. The angle of rotation of the rotary indicator may be then measured and recorded so that the information supplied thereby is preserved in a permanent form. Digital converters per se are conventional and well known to the art and in their earliest form consisted of a series of stepped cams of relatively large diameter wherein the periphery was sufficient to receive thereon a plurality of steps totalling in number an amount feasible for utilization. Briefly, it may be stated that a conventional instrument may require that a full scale measurement be divided into one thousand increments. In this instance, it was necessary to provide one thousand steps in the periphery of the cam. Obviously, cams requiring the minimum of one thousand increments were large and unwiedly and when utilized with measuring instruments presented a problem of size and seriously handicapped the utilization of such instruments. To reduce the size dimensions it was proposed that a continuous transfer mechanism be incorporated between two relatively small cams so that proportional rotation between the two would produce the one thousand increments. This proportional rotation introduced problems of accuracy for the apparent reason that an increment change in the primary cam resulted in a proportional change in a secondary cam. The practical size of the sensing fingers permitted the introduction of error in reading the secondary cam due to creep resulting from the back lash or tolerances normally present between the gearing. It is obvious that any relative play in the gearing when such a relatively small change occurs, could result in an erroneous sensing of the stepped cams.

The present invention provides a novel means for indexing the sensing means relative to the associated stepped cams.

Accordingly, one of the principal objects of the invention resides in the provision of a creep-cam indexing mechanism for accurately indexing the stepped cams during sensing operations.

Another object of the invention is to provide a novel indexing mechanism which is directly proportional to the input shaft so that the indexing operation is continuous relative to the continuous rotation of the stepped cams.

Still another object of the invention is to provide a novel indexing mechanism that normally is inoperative but which becomes operative upon the initiation of a sensing operation thereby permitting bi-directional unrestricted movement of the stepped cams.

Another object is to provide a simple indexing mechanism that may be duplicated for a united cooperation with a plurality of coaxially mounted stepped cams.

The present invention is particularly adaptable to a binary-type digital converter wherein the stepped cams are so arranged that a coding results from the sensing thereof in any selected position. A coding is achieved in a binary manner which may be subsequently converted to digital representation.

Therefore, another object of the invention is to provide a novel indexing mechanism for differentially rotatable stepped cams having binary or digital formations of steps thereon.

Other ancillary objects will be, in part, hereinafter pointed out and will be, in part, hereinafter apparent.

In the drawings:

Figure 3 is a side elevation in partial cross section showing the indexing mechanism in inoperative position.

Figure 4 is a fragmentary elevation schematically illustrating the relative size between the teeth on the stepped cams.

Figure 5 is a fragmentary detail illustrating a conventional detent and detent pawl aligning mechanism.

Figure 1:
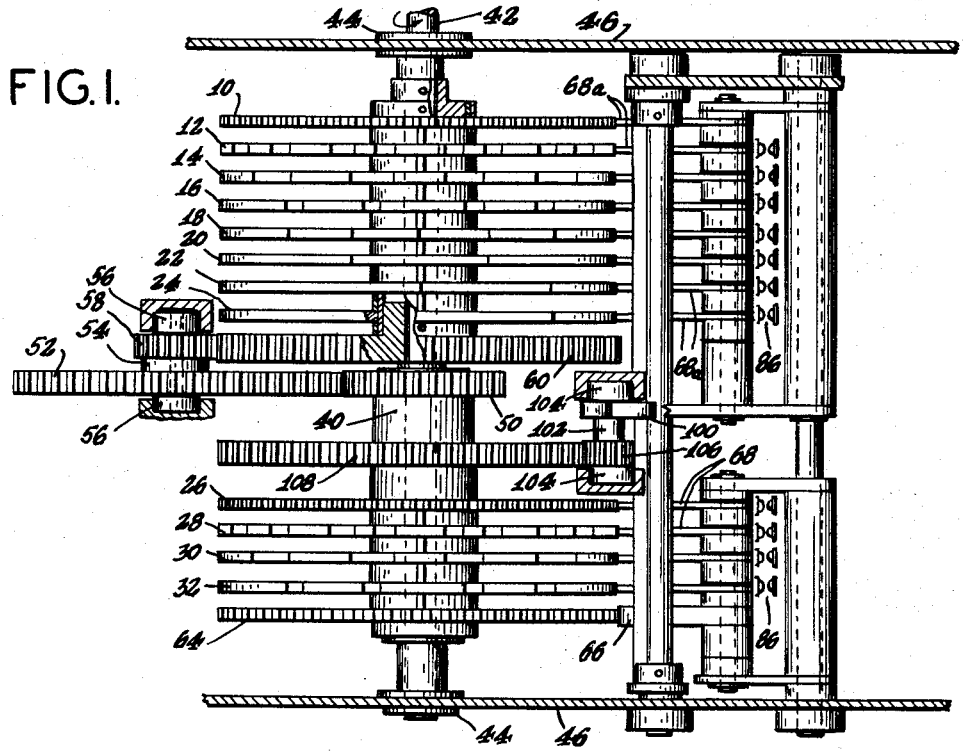
Figure 1 is a bottom view of a binary digital converter incorporating the novel indexing mechanism with the ancillary co-operating mechanism omitted to clarify the present invention.

Briefly, the present invention appertains to an improvement in a binary type digital converter having a rotary imput that directly drives a series of stepped wheels. A second series of stepped wheels is driven through reduction gearing having a 1 to 10 ratio. Both series of stepped wheels are divided into one hundred readable increments. The 1 to 10 ratio introduces sensing problems wherein it is difficult to determine the extent of movement of a single increment in the first series of stepped wheels. Let us assume that the second series of stepped wheels advance one whole increment. This increment is accurately indexed by a detent type star wheel. The first series of stepped wheels would, accordingly, turn one-tenth of an increment as the result of the 1 to 10 gearing ratio. Means are provided to insure the sensing means associated with the first set of stepped wheels of correctly sensing the particular increment. These means are hereinafter described in detail. It is readily obvious in a binary system that the sensing means must contact an on portion or an off portion of the increments on the stepped wheels. The special sensing control means actuate a mechanism that controls the sensing means to be accurately indexed through one complete increment. This one increment appertains to the first set of stepped wheels and as previously set forth, the first set of stepped wheels will rotate one increment for each ten increments of rotation of the second set of stepped wheels. The special control means hereinafter described in detail, is controlled by a cam having a periphery that starts from a minimum dwell and extends to a maximum dwell with a sharp cutoff. The sharp cutoff effectively controls the advancement of the sensing means on the first set of stepped wheels from one increment "on or off" to the next increment. Thus, accurate sensing of each tenth of an increment movement of the first set of stepped wheels is assured.

Binary systems in general are conventional and comprise a method of coding that is well known to those skilled in the art. Therefore, a brief description is all that is required.

As shown below, a simple binary code may be accomplished by the use of four columns of information. The decimal information in the left hand column may be converted into binary information by selective combinations of the four columns of information; for example, the decimal equivalent of zero would be four similar symbols. The binary equivalent of the unit one may be three columns of similar symbols and the last column of a differing symbol. The binary equivalent of the unit two would be the first two columns being of similar symbols, the third column being of dissimilar symbol and the fourth column being similar to the first two columns. The binary equivalent of the unit three may be the first two columns of similar symbols and the last two columns of dissimilar symbols. The binary equivalent of the unit four would be the first, third and fourth columns being of a similar symbol and the second column being of a dissimilar symbol. The code continues in the manner shown. Assuming the four columns to represent individually actuatable switches, then in the instance of the unit one, the fourth switch would be actuated while the other three would remain unactuated. In a like manner, the remaining dissimilar symbols represent switches that are actuated relative to switches that are left unactuated. In the present invention, these switches may be connected to extraneous equipment to control printing recorders, counters, punch card reproducing machines and the like.

| Decimal: | Binary |
|---|---|
| 0 | OOOO |
| 1 | X |
| 2 | XO |
| 3 | XX |
| 4 | XOO |
| 5 | XOX |
| 6 | XXO |
| 7 | XXX |
| 8 | XOOO |
| 9 | XOOX |

Figure 6:
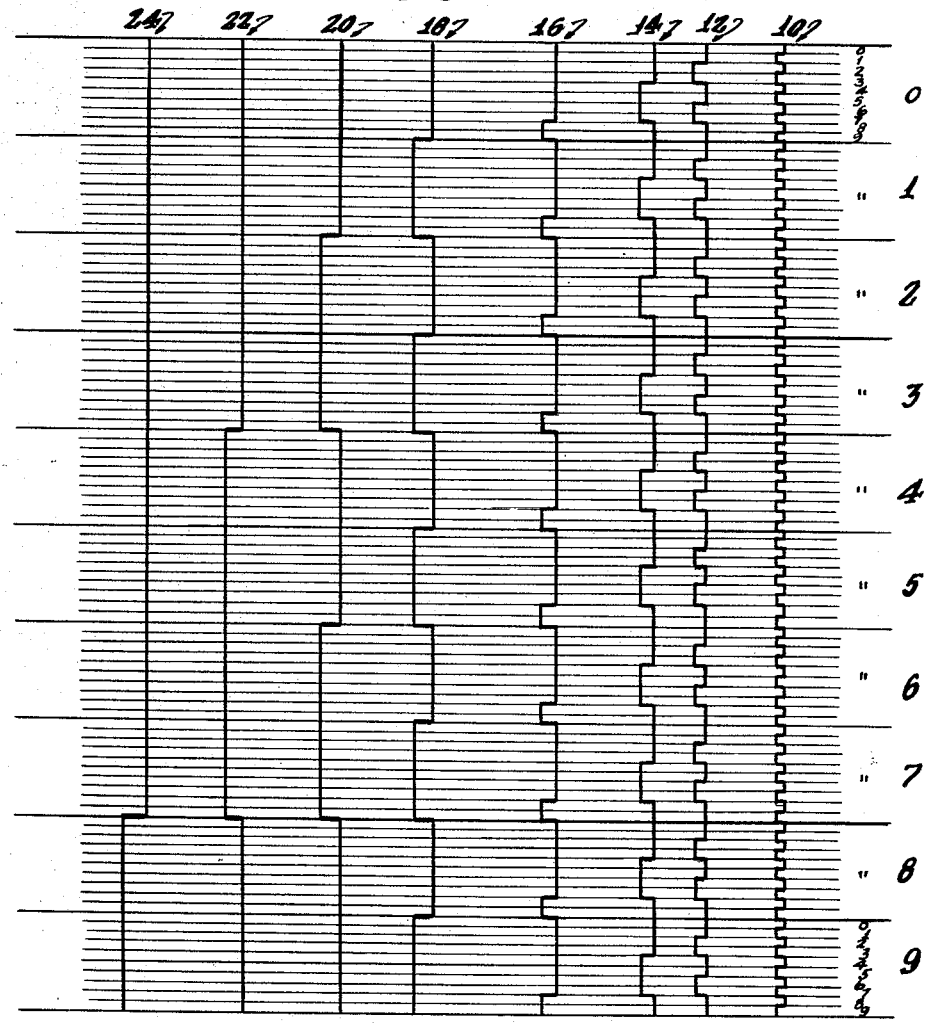
Figure 6 is a schematic diagram illustrating the stepped relationship of the stepped cams that form the binary code.

As shown in Figure 6, there is a schematic diagram of the peripheries of a plurality of stepped cams 10, 12, 14, 16, 18, 20, 22 and 24. Cams 10, 12, 14 and 16 represent a binary group that is the equivalent to a hundreds column of digital information. Cams 18, 20, 22 and 24 represent a second binary group that is equivalent to a tens column of digital information. Cams 26, 28, 30 and 32 (Figure 1) have duplicate peripheries respectively, of the cams 10, 12, 14 and 16. Cams 26, 28, 30 and 32 represent the binary coding of a units column of digital information. The peripheries of the respective cams are divided into one hundred equal increments (Figure 6) irrespective of the actual number of steps thereon. As an example of the coding of the cams 10, 12, 14 and 16, let us assume that the unit 1 is to be illustrated. Cam 10 will be sensed in the uppermost notch while cams 12, 14, and 16 will be sensed on their respective aligned steps. Thus, only the switch associated with the notch in cam 10 would be actuated. A further example, according to the table set forth above, may be the binary representation of the unit 6. In this instance, cam 10 would be sensed on a step, cam 12 would be sensed in a notch, cam 14 would be sensed in a notch and cam 16 would be sensed on a step. Thus, the switches associated with cams 14 and 12 will be actuated while the switches associated with cams 10 and 16 remain unactuated. With reference to the table above, it will be readily apparent that differing combinations are achieved by use of the respective cams in an analogous manner to the example set forth.

Referring to Figure 1 of the drawings, cams 10, 12, 14, 16, 18, 20, 22 and 24 are mounted in fixed spaced relation on the input shaft 42. Input shaft 42 is further journalled in bearings 44, mounted in support plates 46 in a conventional manner. Cams 26, 28, 30 and 32 are similarly mounted in fixed spaced relation but are, however, mounted on a sleeve 40 that is journalled on the shaft 42.

Means are provided to rotate sleeve 40 at an increased proportional rate of rotation relative to the rotation of the shaft 42. Directed toward this end, there is provided a pinion 50 that is affixed to sleeve 40 adjacent to the cam 26. Pinion 50 meshes with a gear 52 journalled on an idler shaft 54 that is supported in suitable mounting means designated as 56. Also affixed to idler shaft 54 is a pinion 58 which in turn meshes with a gear 60 that is affixed to shaft 42 and rotatable therewith. The gear ratio in the gear train 50, 52, 58 and 60 is so designed to provide a ten to one ratio between the cams 10 through 24 and the cams 26 through 32. Thus, a single revolution of the cams 10 through 24 will revolve the cams 26 through 32 ten revolutions.

Also affixed to sleeve 40 is a serrated wheel 64 having one hundred detents therein. Serrated wheel 64 is aligned on sleeve 40 in indexing relation to all of the steps on the respective cams 26 through 32, i.e., when shaft 42 is arrested for a sensing operation, a detent pawl 66 is adapted to engage the serrated wheel 64 at the initiation of the sensing operation and accurately align the cams 26 through 32 in indexing relation with their associated sensing fingers 68, hereinafter described in detail.

In operation, shaft 42 is driven by extraneous means not shown, and will rotate in either direction under the influence of an extraneous measuring instrument. Such an instrument forms no part of the invention and, therefore, is not described herein. Cams 10, 12, 14 and 16 provide the coding for the hundreds decimal units while cams 18, 20, 22 and 24 provide the binary coding for the tens decimal units. Cams 26, 28, 30 and 32 are duplicates of the cams 10 through 16 and provide the binary coding for the decimal units in the units column. Cams 26 through 32 rotate ten times for every single rotation of the cams 10 through 24 and likewise follow in any partial rotation thereof. The proportional rotation of the units group of cams elimniates the heretofore unwieldly size dimensions required for cams having one thousand equal increments thereon. This may be derived from the fact that cams 10, 12, 14 and 16 have one hundred units thereon. Cams 18, 20, 22 and 24 have ten units thereon or the steps equivalent to ten units. Thus, cams 10 through 24 may carry binary coding representative of zero through ninety-nine. Assuming that a third series of stepped cams were to be added directly to the shaft 42 without gearing, then the next group of cams would require one thousand step in a similar relationship as cams 10, 12, 14 and 16. The provision of a gearing at a ratio ten to one thereby permits cams 26, 28, 30 and 32 to be of the same size dimension as cams 10, 12, 14 and 16 since the gearing will rotate cams 26 through 32, a complete revolution for each unit increases in the units column of decimal information. An example of the foregoing would be the rotation of the shaft 42 for five hundred increments wherein cams 10, 12, 14, 16, 18, 20, 22 and 24 would be positioned midway of one complete revolution. However, for the cams 10 through 24 to accomplish this rotation, the cams 26 through 32 would have rotated five complete revolutions. In a similar example, if the decimal equivalent of eight hundred resulted from the movement of shaft 42, eight hundred increments, then the cams 26 through 32 will have rotated eight complete revolutions. In this manner, any one increment of the substantially one thousand increments may be sensed and the decimal equivalent thereof determined.

Figure 2:
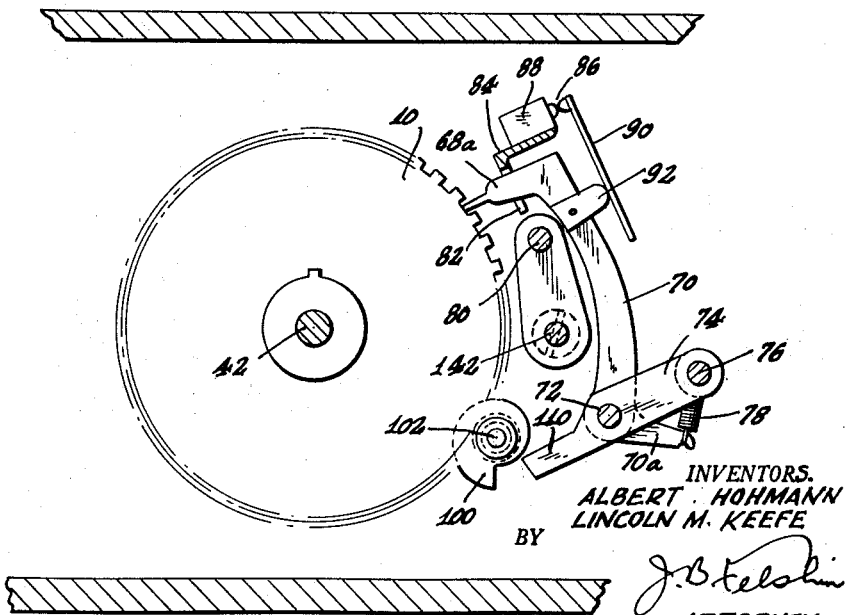
Figure 2 is a side elevation in partial cross section that illustrates the indexing mechanism associated with a sensing finger in actuated position.

Means are provided to sense the stepped cams and directed toward this end is the plurality of sensing fingers 68 and 68a. Sensing fingers 68 and 68a are identical in construction and comprise a lever 70 pivotally mounted on a stud 72 that is pivotally supported on a follower arm 74 which is secured to a shaft 76. Angularly extending from the lever 70 is an arm 70a which anchors one end of a coil spring 78. The other end of coil spring 78 is secured to the shaft 76. Spring 78 is tensioned to urge lever 70 with sensing fingers 68a thereon counterclockwise, as shown in Figures 2 and 3, into engagement with the periphery of the relative stepped cam. A bail 80 is normally disposed in engaging relation with lever 70 to prevent the engaging of the sensing fingers 68a with the stepped cams.

Sensing fingers 68a may be disposed in sliding relation in grooves 82 of a guide comb member 84 to guide the relative movement of the sensing fingers. A normally open switch 86 may have one contact 88 thereof mounted on the guide comb plate 84 and the other contact 90 spring urged into engagement with contact 88 but retained in spaced relation therefrom by means of an insulated protrusion 92 affixed to the lever 70. As shown in Figure 2, bail 80 has moved upwardly, by means hereinafter described, to permit sensing fingers 68a to engage the periphery of the related stepped cam. As shown in Figure 2, the sensing fingers 68a have entered a recess and, therefore, permitted the switch 86 to close. Should the stepped cam stop in a position wherein a step rather than a recess or notch engages the sensing finger 68a, then the switch 86 will remain open.

The foregoing structure is identical for the sensing fingers 68 as well as the sensing fingers 68a. One of the sensing fingers 68a has an additional means thereon that provides the accurate indexing of all fingers 68a. To this end there is provided a creep cam 100 mounted on an idler shaft 102, journalled in bearings 104 and mounted in a suittble frame structure. Also mounted on idler shaft 102 and affixed thereto is a pinion 106 that is disposed in meshing engagement with a gear 108 that is secured to the sleeve 40. As hereinbefore described, sleeve 40 rotates proportionately ten times the rotation of the shaft 42. Gear 108 further increases the proportion so that the idler shaft 102 rotates ten times that of the sleeve 40. Thus, idler shaft 102 and creep cam 100 thereon will rotate one hundred revolutions for every revolution of the shaft 42. The reason for this increased rotation will be hereinafter apparent.

Figure 7:
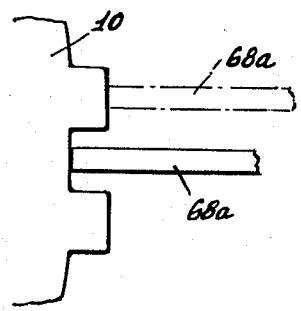
Figure 7 is a fragmentary detail of a portion of a cam showing the indexing of the related sensing finger with its maximum movement shown in dotted line.

As shown in Figure 6, there are ten consecutive "zero to nine" steps around the periphery of cam 10. Therefore, cam 10 has one hundred increments thereon which may be sensed by its related sensing finger 68a. As hereinbefore set forth, the one hundred positions on the cam 26 are indexed by means of the serrated wheel 64 and a cooperating detent 66. The serrated wheel is aligned so that there is provided a notch for each recess in the cam 26. Thus, when a sensing operation occurs the detent 66 will engage the serrated wheel 64 prior to the engagement of the sensing fingers 68 and will index cams 26, 28, 30 and 32 relative to the sensing finger 68 so that an accurate reading of the arrested positions of said cams is obtained. The cams 10 through 24, however, creep slightly in their arrested position and accordingly vary from their normal or accurate index position due to inherent characteristics of the drive gear train. In the particular instance of cam 10, the numerous increments may be displaced accumulatively and permit an error to result. The creep cam 100 prevents error from occurring and accurately indexed the cams 10 through 24 in the following manner:

Follower arm 74 is provided with a cam extension 110 that is normally disposed out of the path of cam 100 but which will engage the periphery of cam 100 when bail 80 is moved forward and sensing pin 68a engages with the periphery of the respective stepped cam. Creep cam 100 is provided with an extreme low dwell that gradually increases to a high dwell. As shown in Figure 7, creep cam 100 effectively indexes the sensing finger 68a from the position shown in full line to the position shown in dotted line. Upon completing the cycle of rotation, the indexing relationship of the creep cam 100 returns the sensing fingers 68a to the initial indexing position as shown in full line, i.e., with each increment advancement, creep cam 100 returns to a position where arm 110 engages the high dwell thereon. In this position, sensing fingers 68a will move upwardly a minimum distance. Drive means, hereinafter described, urges follower arm 74 into engagement with the creep cam and in so doing limits the movement of the sensing finger 68a upwardly until stopped by the particular radial portion of the periphery of creep cam 100 that the arm 110 engages.

The indexed point for the sensing fingers 68a is substantially the midpoint of a recess or a step on the cam 10. Accordingly, with each complete increment advancement of cam 10, cam 100 will rotate 360°. The normal creep of cam 10 will be, therefore, automatically compensated by the creep cam 100.

Referring to Figure 3, drive means are provided for performing the sensing operation. Motive means, not shown, but which may be a conventional motor driven one revolution clutch rotating a shaft 120 one complete revolution for each sensing operation. Cam 122 affixed to and rotatable with shaft 120 controls a follower roller 124 journaled on an arm 126. Follower roller 124 is spring urged by means, not shown, into engagement with the periphery of cam 122. Arm 126 is affixed to shaft 76. Accordingly, rotation of cam 122 effects a controlled rotation of the shaft 76. As hereinbefore pointed out, shaft 76 controls upward movement of the sensing fingers 68a. Referring to Figure 2, it will be noted that the arm 110 is also affixed to the shaft 76 and carries the sensing fingers 68a thereon. Therefore, clockwise rotation of the shaft 76, such as would occur with the clockwise rotation of the cam 122, in effect rotates arm 110 clockwise raising and carrying the sensing fingers 68a therewith. This upward movement is circumferential relative to the periphery of stepped wheel 10. The degree of rotation of arm 110 is limited and determined by the particular position of the creep cam 100. As previously set forth, cam 100 rotates synchronously with cam 10, i.e., each incremental rotation of cam 10 effects a 360° rotation of cam 100. Accordingly, cam 100 controls the indexing of the fingers 68a relative to the proper sensing position of the increment being sensed of cam 10. It is obvious that the minute movement of cam 10 between single increments could be insufficient for the sensing fingers 68a to properly sense the notch or step, whichever the case may be, and, therefore, the control of the fingers 68a by means of the cam 100 assures that the fingers 68a will sense the proper portion of the cam or step wheel 10. Thus, it may be said that cam 100 indexes the sensing fingers relative to the proper sensing relationship of the sensing fingers 68a to the stepped wheel 10.

A bell crank 130 has on one arm thereof a follower roller 132 that engages the periphery of a cam 134 which is also secured to shaft 120. Bell crank 130 is pivotally mounted on a stud 136 and has the other arm thereof pivotally secured to a link 138. Link 138 is pivotally secured at its other end to an arm 140 which is affixed to a shaft 142. Shaft 142 has secured thereon a pair of arms 144 between which the bail 80 is mounted. Spring means, not shown, are provided in a conventional manner to urge follower roller 132 in peripheral engagement with the cam 134. The timing of the shaft 120 is such that bail 80 is moved counterclockwise around shaft 142 after the sensing fingers have moved upwardly to their indexed position.

Then, spring 78 associated with the sensing finger urges said sensing finger into engagement with the periphery of the related cam. The switches 86 are actuated according to the cam periphery and a coding is accomplished. The actual electrical circuits are conventional and form no part of this invention and accordingly, are not described in detail herein.

*Operation*

The shaft 42 is generally connected to an extraneous measuring instrument and is rotated bi-directionally in accordance with the measurements being measured by said instrument. The increments of rotation of shaft 42 are naturally synonymous to the measurements of the measurements of the measuring instrument. Accordingly, shaft 42 may freely rotate in a continuous manner or in an intermittent manner and when it is desired that a record be made of the angle of shaft 42 at any given instant, control means, not shown, may be manually or otherwise actuated to initiate a sensing operation. The motive means for the shaft 120 is energized and said shaft performs one revolution. As hereinbefore set forth, the detent pawl 66 engages the detent wheel 64 prior to the engagement of sensing fingers 68 and 68a with the respective cams. While it is not shown, conventional spring means are associated with the detent pawl 66 to permit the continued movement of the sensing fingers into engagement with the related cams. The pawl 66, accordingly, engages and arrests the rotation of the shaft 42 and the related cams thereon. With the arresting of the shaft 42, the creep cam 100 is similarly arrested and the arm 110 senses the relative position of the creep cam and controls the indexing of the fingers 68a associated therewith and accurately indexes said fingers on the correct cam increment. The fingers 68 are not indexed under the control of creep cam 100 for the obvious reason that the detent wheel 64 independently indexes the cams associated with the sensing fingers 68.

The continued rotation of the shaft 120 restores the sensing fingers to their ineffective position and permits the rotary shaft 42 to continue rotation under control of the extraneous measuring instrument.

The direct relation of the creep cam 100 to the shaft 42 insures the accurate indexing of the fingers 68a irrespective of the increment at which the shaft is arrested.

It will thus be seen that there is provided a device in which the several objects of this invention are achieved and which is well adapted to meet the conditions of practical use.

We claim:

1. In a device of the class described, rotatable input means, a plurality of stepped cams connected to be rotated by said input means, a second plurality of stepped cams journalled on said input means, drive means interconnecting said second plurality of stepped cams with said first plurality of stepped cams and adapted to differentially rotate said pluralities of stepped cams, plural radially movable sensing means and one of said sensing means being circumferentially movable relative to the periphery of its associated stepped cam, and means differentially rotatable with respect to the first plurality of stepped cams to radially index the circumferential movement of the sensing means for sensing said first plurality of stepped cams.

2. In a device of the class described, rotatable input means, a plurality of stepped cams connected to said input means and rotatable therewith, a second plurality of stepped cams, drive means interconnecting said second plurality of stepped cams with said input means and adapted to differentially rotate said cams, plural radially movable sensing means and one of said sensing means being additionally movable circumferentially relative to the periphery of the stepped cams, means to radially index the circumferential movement of the sensing means for sensing one of said plurality of stepped cams, and said indexing means being controlled by said input means.

3. In a digital converter having an input means and a pair of stepped cams, continuous transfer means interconnecting said cams wherein rotation of said input means differentially rotates said stepped cams relative one to the other, circumferentially movable sensing means adapted to radially sense said pair of cams, and means controlled by said input means for variably controlling the circumferential movement of said sensing means relative to said stepped cams.

4. In a digital converter of the class described, in combination, an input shaft, a plurality of stepped cams connected to said input shaft, radially movable sensing means having fixed index relation for sensing the periphery of said plurality of stepped cams in any selected position, a second plurality of stepped cams journalled on said input shaft, continuous drive means interconnecting said plurality of stepped cams with said first plurality of stepped cams, radially and circumferentially movable sensing means for sensing the periphery of said second plurality of stepped cams, and means controlled by said input shaft to variably control the circumferential movement of said second sensing means.

5. In a digital converter of the class described, in combination, an input shaft, a plurality of stepped cams connected to said input shaft, radially movable sensing means having fixed index relation for sensing the periphery of said plurality of stepped cams in any selected position, a second plurality of stepped cams, continuous drive means interconnecting said second plurality of stepped cams with said first plurality of stepped cams and adapted to differentially rotate said first and second pluralities of cams relative to each other, radially and circumferentially sensing means for sensing the periphery of said second plurality of stepped cams, means controlled by said input shaft to variably control the circumferential movement of and thereby index the radial movement of said second sensing means, said variable indexing means being differentially operable with and proportional to the angle of rotation of said second plurality of stepped cams.

6. In a digital converter having plural stepped cams and sensing means for radially sensing the peripheries of said stepped cams in any arrested position thereof, including a circumferentially movable sensing means for sensing at least one of said stepped cams, in combination, means for rotating one of said stepped cams at a rate of rotation proportional to the rate of rotation of the other of said stepped cams, and means controlled by the rotation of one of said stepped cams to variably index the circumferentially movable sensing means associated with the other of said stepped cams.

7. In a digital converted having plural differentially rotatable stepped cams and an input means for rotating said stepped cams, plural radially movable sensing means adapted to be actuated to sense the peripheries of said stepped cams in any arrested position, fixed indexing means for indexing at least one of said plural stepped cams relative to its associated sensing means, and means for variably indexing the sensing means associated with said other plural stepped cams, said last sensing means being radially and circumferentially movable and adapted to be radially indexed by said indexing means at any position of its circumferential movement.

8. In a digital converter having plural differentially rotatable stepped cams and an input means for rotating said stepped cams plural radially movable sensing means adapted to be actuated to sense the peripheries of said stepped cams in any arrested position, and including circumferentially movable sensing means, fixed indexing means for indexing at least one of said plural stepped cams relative to its associated circumferential movement of the sensing means, means for variably indexing the sensing means associated with said other plural stepped cams, and said last means being controlled by said input means.

9. In combination, a revolvable input, a first cam, means controlled by the input to rotate the first cam in predetermined relation to the input, a second cam, means connecting said cams to rotate one in a differential relation to the other, means to index the second cam in a plurality of equi-angularly spaced indexed positions, whereby to stop the first cam in a plurality of corresponding indexing positions, means engageable with the periphery of the first cam to sense the angular position of the first cam in each indexed position of said second cam, and means to variably position the sensing means between the limits of an increment of movement of the first cam to follow the first cam a peripheral distance corresponding to the angle the second cam is beyond the indexed position it should have if it accurately corresponded to the indexed position of the second cam to compensate for the creep resulting from the differenial rotating means.

10. In a digital converted, in combination, a rotatable input shaft, a plurality of cams having stepped peripheries, said cams being connected to said rotatable input shaft, a second plurality of stepped cams differentially connected to said first plurality of stepped cams and adapted to rotate proportionately in equi-angular increments to the incremental rotation of said first plurality of stepped cams, a plurality of sensing fingers, each of said fingers being associated with a related cam of said second plurality of cams, the said fingers being adapted to move radially to engage the periphery of said cams, a second plurality of sensing fingers, each of said second plurality of sensing fingers being adapted to be moved radially and circumferentially to engage the periphery of a related cam in said first plurality of stepped cams, and means controlled by said second plurality of stepped cams for determining the circumferential movement of the sensing fingers associated with said first plurality of stepped cams.

11. In a digital converter, in combination, a rotatable input shaft, a plurality of cams having stepped peripheries, said cams being connected to said rotatable input shaft, a second plurality of stepped cams differentially connected to said first plurality of stepped cams and adapted to rotate proportionately in equi-angular increments to the incremental rotation of said first plurality of stepped cams, a plurality of sensing fingers, each of said fingers being associated with a related cam of said second plurality of cams, the said fingers being adapted to move radially to engage the periphery of said cams, a second plurality of sensing fingers, each of said second plurality of sensing fingers being adapted to be moved radially and circumferentially to engage the periphery of a related cam in said first plurality of stepped cams, means controlled by said second plurality of stepped cams for determining the circumferential movement of the sensing fingers associated with said first plurality of stepped cams and means for moving said sensing fingers radially to engage the cam peripheries to sense both pluralities of said stepped cams simultaneously.

12. In a digital converter, in combination, an input shaft adapted to be rotated in predetermined angular increments, a plurality of stepped cams connected to said input shaft and rotatable therewith in corresponding angular increments, a second plurality of stepped cams differentially connected to said first plurality of stepped cams and rotatable in proportionate angular increments relative to the angular increments of said first plurality of stepped cams, a plurality of sensing fingers adapted to be moved radially toward the peripheries of said first plurality of stepped cams, a plurality of sensing fingers associated with said second plurality of stepped cams and adapted to be moved radially toward the peripheries thereof, said second plurality of sensing fingers being movable in an arcuate path paralleling the peripheries of said first plurality of stepped cams, means for limiting the arcuate movement of said plurality of sensing fingers, and said limit means being proportionately variable from a maximum to a minimum in accordance with the incremental angular movement of said second plurality of stepped cams.

13. In a digital converter, in combination, a rotatable shaft, plural stepped cams disposed in spaced relation on and secured to said shaft, a second plurality of stepped cams journalled on said shaft, gear means interconnecting said second plurality of stepped cams with said shaft whereby said second plurality of stepped cams rotates in proportional increments relative to the increments of rotation of said first plurality of stepped cams, a star wheel journalled on said shaft and rotatable with said second plurality of stepped cams, sensing means adapted to engage the peripheries of said second plurality of stepped cams, a pawl carried by said sensing means adapted to engage said star wheel to index said second plurality of stepped cams relative to said sensing means, a said second means adapted to engage the peripheries of said first plurality of stepped cams, means for variably indexing said second sensing means relative to said first plurality of stepped cams, said second sensing means being adapted to engage the peripheries of said first plurality of stepped cams at a relative indexed position determined by said indexing means, and said indexing means comprising a rotatable creep cam adapted to rotate one complete revolution for each angular increment of rotation of said input shaft.

References Cited in the file of this patent

UNITED STATES PATENTS

| 2,207,743 | Larson et al. | July 16, 1940 |
| 2,577,820 | Singleton | Dec. 11, 1951 |
| 2,656,497 | Schweighofer | Oct. 20, 1953 |
| 2,713,680 | Ackerlind | July 19, 1955 |

OTHER REFERENCES

Proceedings of the ACM, May 2, 1952, pages 38–39, B. M. Gordon.